United States Patent
Hanks et al.

(10) Patent No.: US 7,538,788 B2
(45) Date of Patent: May 26, 2009

(54) LABEL WRITING

(75) Inventors: Darwin M. Hanks, Fort Collins, CO (US); Lawrence Nathaniel Taugher, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

(21) Appl. No.: 11/415,038

(22) Filed: May 1, 2006

(65) Prior Publication Data

US 2007/0252889 A1 Nov. 1, 2007

(51) Int. Cl.
*B41J 2/435* (2006.01)

(52) U.S. Cl. ........................................... 347/224

(58) Field of Classification Search ......... 347/224–225, 347/251; 346/131; 369/47.4; 428/64.4
See application file for complete search history.

(56) References Cited

U.S. PATENT DOCUMENTS

| | | | |
|---|---|---|---|
| 5,317,337 A | 5/1994 | Ewaldt | |
| 5,518,325 A | 5/1996 | Kahle | |
| 5,616,447 A | 4/1997 | Arioka | |
| 6,074,031 A | 6/2000 | Kahle | |
| 6,109,324 A | 8/2000 | Bugner et al. | |
| 6,501,718 B1 | 12/2002 | Ono et al. | |
| 6,534,142 B1 | 3/2003 | Hummell et al. | |
| 6,778,205 B2 * | 8/2004 | Anderson et al. | 347/251 |
| 2002/0048241 A1 | 4/2002 | Kumagai et al. | |
| 2002/0191517 A1 | 12/2002 | Honda et al. | |
| 2003/0107959 A1 | 6/2003 | Norton et al. | |
| 2003/0108708 A1 * | 6/2003 | Anderson et al. | 428/64.4 |
| 2003/0161224 A1 | 8/2003 | Anderson et al. | |
| 2003/0194214 A1 | 10/2003 | Anderson et al. | |
| 2004/0037176 A1 | 2/2004 | Morishima | |
| 2004/0057356 A1 | 3/2004 | Morishima | |
| 2004/0141445 A1 | 7/2004 | Hanks | |
| 2004/0146001 A1 | 7/2004 | Koll et al. | |
| 2005/0046692 A1 | 3/2005 | Bronson | |
| 2005/0047287 A1 * | 3/2005 | Hanks | 369/44.26 |
| 2005/0169115 A1 | 8/2005 | Nagano | |
| 2005/0206661 A1 * | 9/2005 | Lugaresi et al. | 346/131 |
| 2005/0266413 A1 | 12/2005 | Shivji | |
| 2005/0270928 A1 | 12/2005 | Sugahara et al. | |
| 2005/0276189 A1 | 12/2005 | Koll et al. | |
| 2006/0018243 A1 | 1/2006 | Ohtsubo | |
| 2006/0239142 A1 * | 10/2006 | Morishima | 369/47.4 |

FOREIGN PATENT DOCUMENTS

| | | |
|---|---|---|
| JP | 09-123606 | 5/1997 |
| JP | 09-123607 | 5/1997 |
| JP | 09-265760 | 10/1997 |
| JP | 09-306144 | 11/1997 |
| JP | 10-320963 | 4/1998 |
| JP | 11-003543 | 1/1999 |
| JP | 2000-155989 | 6/2000 |
| JP | 2000-173096 | 6/2000 |
| JP | 2000-173238 | 6/2000 |
| JP | 2002-216396 | 8/2002 |
| JP | 2006-099817 A | 4/2006 |
| WO | 2004/046692 A | 8/2004 |

OTHER PUBLICATIONS

International Search Report for PCT Patent Application No. PCT/US2007/010440.

* cited by examiner

*Primary Examiner*—Hai C Pham

(57) ABSTRACT

Various embodiments and methods relating to the writing of a label on a disc at the same time that data is written upon the disk are disclosed.

18 Claims, 4 Drawing Sheets

LABEL WRITING

BACKGROUND

Discs, such as CDs, DVDs, Blu-Ray, and the like, are used to store data such as music, photos, documents and the like. Such discs may also be labeled. Labeling of discs involves an additional labeling step and may further involve flipping of the disc, increasing the time and inconvenience of labeling.

DETAILED DESCRIPTION OF THE EXAMPLE EMBODIMENTS

Figure 1:
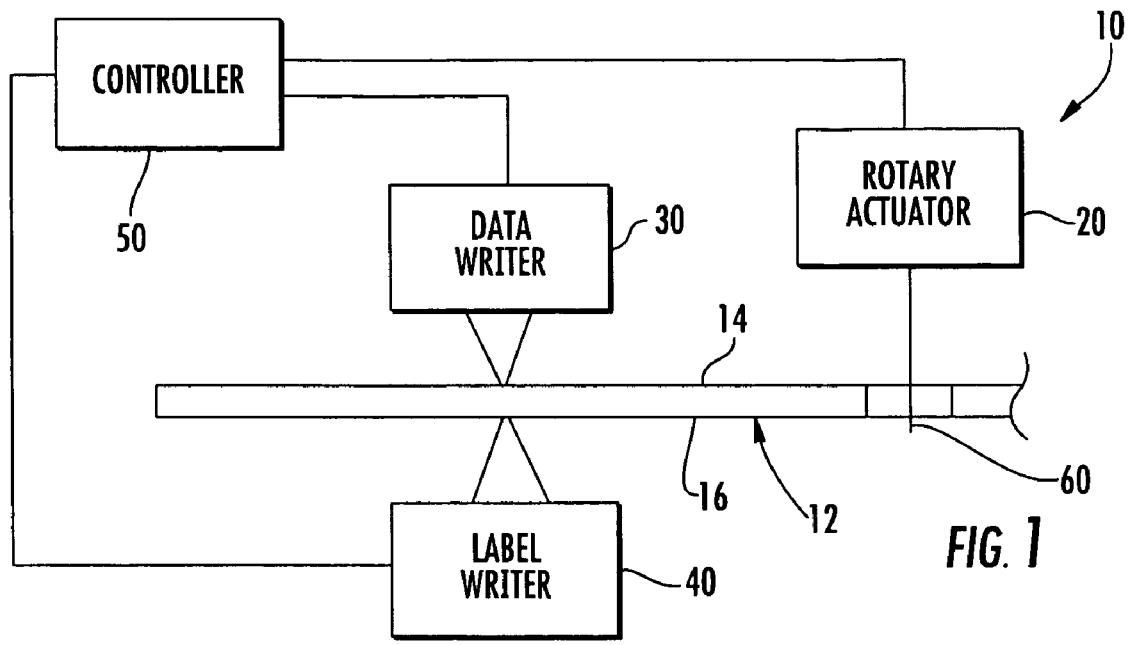
FIG. 1 is a schematic illustration of one example of a disc interaction system according to an example embodiment.

FIG. 1 schematically illustrates one example of disc interaction system 10 according to an example embodiment. Disc interaction system 10 comprises a device, such as an optical disc drive, configured to write a label on a disc 12 while data is also being written on disc 12. As a result, the time and inconvenience of labeling disc 12 may be reduced.

Disc interaction system 10 generally includes rotary actuator 20, data writer 30, label writer 40 and controller 50. Rotary actuator 20 comprises a device configured to rotatably drive disc 12 about an axis 60. In one embodiment, rotary actuator 20 may include a spindle and a motor (not shown) configured to rotate the spindle. In one embodiment, rotary actuator 20 is configured to rotatably drive disc 12 about axis 60 at a speed at which data is written upon disc 12 while the label is also being written upon disc 12. In one embodiment, rotary actuator 20 is configured to rotatably drive disc at a speed of at least about 200 revolutions per minute (rpm) and up to at least about 10,000 rpm (or greater) during at least one moment in time during which the label is written upon disc 12. In one embodiment, rotary actuator 20 is further configured to rotate disc 12 at a constant angular velocity as the label is written upon disc 12. In other embodiments, rotary actuator 20 may comprise other devices and may be configured to rotate disc 12 in other manners.

Data writer 30 comprises a device configured to write data upon disc 12. For purposes of this disclosure, the term "data" shall mean information that is encoded so as to be machine or computer-readable. For example, information may be digitally encoded with binary bits or values. Such data may have different formats such as various presently or future created music, photo and document formats. Such data is generally encoded by writer 30 upon disc 12. Although the existence of the data on the disc may, in some embodiments, be visually seen by the human eye as darker or lighter rings on the disc, the content or information encoded by the data is generally not readable by a human eye. In other words, the darker or lighter rings that may be viewed on the disc do not communicate information to a person viewing the rings and do not identify or label characteristics of the data.

According to one embodiment, data writer 30 includes a source of coherent light, such as a laser, configured to selectively direct a laser beam at disc 12 so as to optically translate or write the encoded information or data upon disc 12. In one embodiment, the laser may further be configured to be adjusted so as to apply laser beams with different levels of power. In particular embodiments, data writer 30 may additionally include optics or other mechanisms for selectively focusing a laser beam upon disc 12 and one or more actuation devices configured to selectively position the laser radially along disc 12.

Disc 12 comprises a storage medium configured to store data. Disc 12 is configured to be rotatably driven to facilitate writing of data to and retrieval of data from disc 12. Disc 12 is further configured to have one or more labels written upon it. For purposes on this disclosure, the term "label" shall mean any image, graphic, photo, drawing, picture, alphanumeric symbols, design and the like that are visible to a human eye. Such labeling may directly communicate information regarding the content or characteristic of the data on disc 12 to a person. Such labeling may also alternatively visually communicate other unencoded information to a person.

In one embodiment, disc 12 comprises an optical disc. Disc 12 includes both data storage portions and label portions. In one embodiment, data storage portions are located on a first side 14 of disc 12 and label portions are located on a second opposite side 16 of disc 12. For purposes of this disclosure, when discussing the disc, the term "side" refers to the general side from which the data or label may be read or otherwise accessed and not the relative positioning of a layer of material or the positioning of the data or label with respect to a plane bisecting a thickness of the disc. For example, in some embodiments, label markings on disc 12 may be viewed or accessed from side 16 of disc 12 although being on the opposite side of the plane bisecting sides 14 and 16, thus being physically closer to side 14.

In one embodiment, data storage portions and label portions of disc 12 each include one of more layers of one or more materials configured to change between a light translucent state and a darkened light-absorbing or light-attenuating state in response to being irradiated by energy such as from a laser. One example of such a material includes BK-400 or Black 400 commercially available from Nagase America Corporation, New York, N.Y. In other embodiments, disc 12 may alternatively include other materials.

In particular embodiments, data storage portions and label portions of disc 12 each additionally include or share one or more reflective layers which facilitate reading of data written on disc 12 and viewing of a label written on disc 12. In other embodiments, such layers may be omitted. Examples of disc 12 include, but are not limited to, writeable and rewriteable compact discs (CD+/−R, CD+/−RW), writeable and rewriteable digital versatile discs (DVD+/−R, DVD+/−RW), Blu-Ray discs and the like. Disc 12 may comprise any presently developed or future developed storage disc configured to be optically written upon with a laser.

Label writer 40 comprises a device configured to write a label upon disc 12. In particular, label writer 40 comprises a device configured to write a label upon disc 12 concurrently with the writing of data upon disc 12 by data writer 30. In the embodiment illustrated, label writer 40 is positioned on an opposite side 16 of disc 12 as data writer 30. As a result, is well suited for interacting with discs in which data is written on a first side and in which a label is written on a second side.

In one embodiment, label writer 40 includes a laser configured to selectively direct a laser beam at disc 12 so as to write the label upon disc 12. In one embodiment, the laser may further be configured to be adjusted so as to apply laser beams with different levels of power. In particular embodiments, data writer 30 may additionally include optics or other mechanisms for selectively focusing a laser beam upon disc 12 and one or more actuation devices configured to selectively position the laser radially along disc 12.

Controller 50 comprises one or more processing units in communication with rotary actuator 20, data writer 30 and label writer 40. For purposes of this disclosure, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 50 is not limited to any specific combination of hardware circuitry and software, nor to any particular source for the instructions executed by the processing unit.

Controller 50 generates control signals directing and coordinating the operation of rotary actuator 20, data writer 30 and label writer 40. In operation, controller 50 generates control signals directing rotary actuator 20 to rotate disc 12 about axis 60. At the same time or nearly the same time, controller 50 also generates control signals directing data writer 30 to write data upon disc 12 and label writer 40 to write one or more labels upon disc 12.

In one embodiment, controller 50 generates control signals directing data writer 30 and label writer 40 to radially position lasers with respect to disc 12, to selectively irradiate portions of disc 12 with a laser beam, to control the focus of a laser beams upon disc 12 and to control or adjust a level of power of the laser beams. In particular embodiments, the laser beams of data writer 30 and label writer 40 may be different from one another and may be adjusted independently of one another. As will be described in greater detail hereafter, controller 50 generates control signals such that label writer 40 writes a label on disc 12 while rotary actuator 20 is rotating disc 12 at a speed at which data is written on disc 12. In contrast to other systems in which data is written on disc 12 while disc 12 is being rotated at a first higher-speed and labels are written on disc 12 at a distinct time while disc 12 is being rotated at a second slower speed, controller 50 generates control signals adjusting the operation characteristics of label writer 40 to enhance the ability of label writer 40 to write a label on disc 12 while disc 12 is being rotated at the generally higher speeds at which data is written on disc 12. As a result, the time for labeling disc 12 may be reduced.

Figure 2:
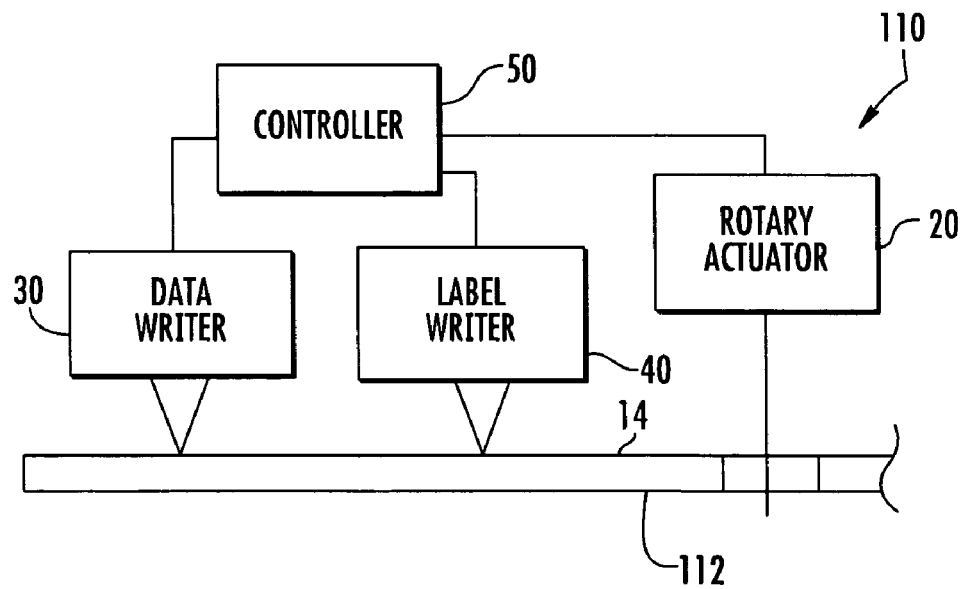
FIG. 2 is a schematic illustration of another embodiment of the disc interaction system of FIG. 1 according to an example embodiment.

FIG. 2 schematically illustrates disc interaction system 110, another embodiment of disc interaction system 10. Disc interaction system 110 is substantially identical to disc interaction system 10 except that system 110 is configured to concurrently write data and a label to a common side of a disc. In particular, system of 110 supports or positions label writer 40 on a common side of a disc with data writer 30. Label writer 40 and data writer 30 are configured so as to be radially movable along portions of a disc without physically interfering with one another. For example, in one embodiment, data writer 30 and label writer 40 may be configured to move along distinct radial lines relative to a disc, such as the illustrated disc 112. Disc 112 is similar to disc 12 except that disc 112 includes data writeable portions and label writeable portions on a common side 14. The remaining general operation of system 110 is essentially similar to the operation of system 10.

Figure 3:
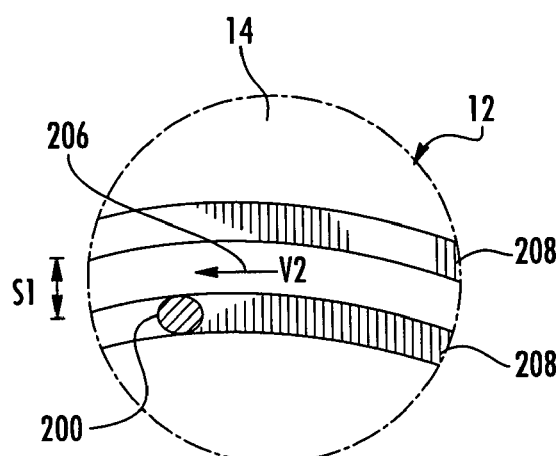
FIG. 3 is an enlarged fragmentary plan view of a disc illustrating writing of data on the disc according to an example embodiment.

FIG. 3 is a greatly enlarged fragmentary view of a portion of disc 12 illustrating the writing of data to side 14 of disc 12. As schematically shown in in FIG. 3, data writer 30 writes data to disc 12 with a laser beam 200. Data writer 30 provides laser beam 200 with a predetermined level of focus such that laser beam 200 has a predetermined spot size (schematically represented by the size of the circle) at the location upon side 14 of disc 12 at which data is being written and a predetermined level of power (schematically represented by the density of diagonal lines or cross-hatching within the circle). As indicated by arrow 206, controller 50 generates control signals such that rotary actuator 20 rotates disc 12 at a velocity V2. In one embodiment, rotary actuator 20 rotate disc 12 at a constant angular velocity during the writing of data by data writer 30 (shown in FIG. 1) radially across disc 12. In one embodiment, rotary actuator 20 rotates disc 12 any speed of at least about 200 rpm and nominally 10,000 rpm (or greater). During rotation of disc 12, laser beam 200 transmits energy to data writeable portions of the disc 12 to write data upon disc 12. In particular, in one embodiment, the energy applied by laser beam 200 changes the light absorption or light attenuating characteristics of those portions of disc 12 being irradiated to alter or mark portions of disc 12 and to write data thereto. Because rotary actuator 20 is rotating disc 12, laser beam 200 writes data to disc 12 along data rings or tracks 208. Data writer 30 is configured to radially move laser beam 200 to control which track is being written upon as well as the density or spacing of tracks 208. In the example illustrated in FIG. 3, tracks 208 have a radial spacing S1. In one embodiment, spacing S1 is between about 740 nm for a DVD, about 1.6 micrometers for a CD and about 300 nm for a Blu-Ray disc.

Figure 4:
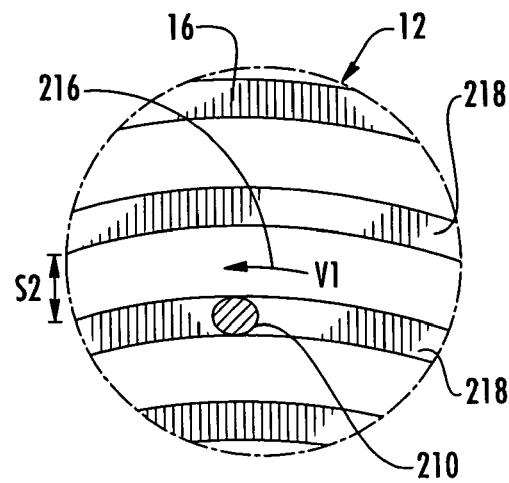
FIG. 4 is an enlarged fragmentary plan view of the disc of FIG. 3 illustrating writing of a label on the disc prior to or subsequent to the writing of data on the disc according to an example embodiment.

FIG. 4 schematically illustrates the writing of a label to disc 12 by label writer 40 according to a first labeling mode prior to or after the writing of data to disc 12 by data writer 30. As shown by FIG. 4, label writer 40 writes a label on side 16 of disc 12 with a laser beam 210. Label writer 40 provides laser beam 210 with a predetermined level of focus such that laser beam 210 has a predetermined spot size (schematically represented by the size of the circle) at the location upon disc 12 at which data is being written and a predetermined level of power (schematically represented by the density of diagonal lines or cross-hatching within the circle). As indicated by arrow 216, controller 50 generates control signals such that rotary actuator 20 rotates disc 12 at a velocity V1. In one embodiment, rotary actuator 20 rotates disc 12 at a constant linear velocity during the writing of a label by label writer 40 (shown in FIG. 1) radially across disc 12.

In one embodiment, rotary actuator 20 rotates disc 12 at a speed slower than the speed at which data is written, V2, and nominally 123 rpm. During rotation of disc 12, laser beam 210 transmits energy to label writeable portions of the disc 12 to write a label upon disc 12. In particular, in one embodiment, the energy applied by laser beam 210 changes the light absorption or light attenuating characteristics of those portions of disc 12 being irradiated to alter or mark portions of disc 12 and to write a label thereto. Because rotary actuator 20 is rotating disc 12, laser beam 200 writes a label to disc 12 along rings or tracks 218. Label writer 40 is configured to radially move laser beam 210 to control the density or spacing of tracks 218. In the example illustrated in FIG. 4, tracks 218 have a radial spacing S2. In one embodiment, spacing S2 is between about one micrometer and about 60 micrometers.

Figure 5:
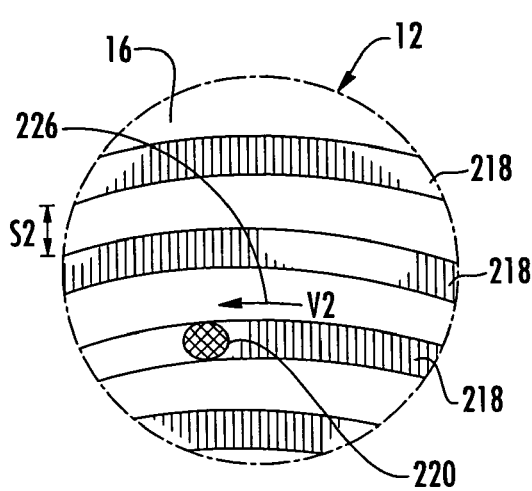
FIG. 5 is an enlarged fragmentary plan view of the disc of FIG. 3 illustrating writing of a label on the disc concurrently with a writing of data on the disc according to an example labeling mode according to one example embodiment.

FIG. 5 schematically illustrates an alternative labeling mode of system 10 in which data and a label are concurrently written upon sides 14 and 16, respectively, of disc 12. In the alternative labeling mode illustrated in FIG. 5, data is written upon side 14 as described above with respect to FIG. 3. However, the method or process parameters under which a label is written upon side 16 of disc 12 are modified or adjusted by controller 50 (shown in FIG. 1). As shown by FIG. 5, in the embodiment illustrated, the speed at which data is written to disc 12 is generally not adjusted or modified to accommodate the concurrent writing of a label on side 16 of disc 12. In particular, disc 12 is rotated by rotary actuator 20 at the same speed V 2. As compared to the label writing mode shown and described with respect to FIG. 4, disc 12 is being rotatably driven at a speed V2 greater than speed V1. To accommodate the greater rotational speed of disc 12 during writing of a label with the mode shown in FIG. 5, label writer 40 writes a label with a laser beam 220 having a greater level of power (schematically represented by the greater density or number of crosshatchings) as compared to level of power of laser beam 210 used during the label writing operation in FIG. 4. As shown by FIG. 5, the spot size of laser beam 220 and to the density or spacing of tracks 218, S2, is substantially the same.

According to one embodiment, with the mode of label writing shown in FIG. 5, disc 12 is rotated with the constant angular velocity of about 200 rpm (or greater). In such an embodiment, the velocity V2 at which disc 12 is being rotated is approximately 81 times that of the speed V1 at which disc 12 is rotated in the labeling mode shown in FIG. 4. As a result, the power level of laser beam 220 is also multiplied by 81 to approximately 3.2 Watts.

Figure 6:
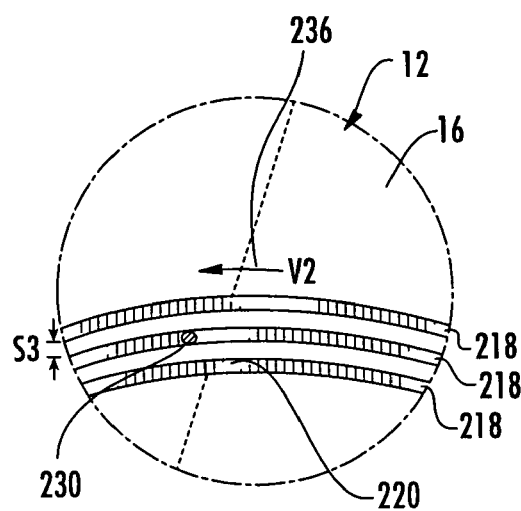
FIG. 6 is an enlarged fragmentary plan view of the disc of FIG. 3 illustrating writing of a label on the disc concurrently with writing of data on the disc according to another example labeling mode according to an example embodiment.

FIG. 6 schematically illustrates another example mode of writing a label to disc 12. In the embodiment shown in FIG. 6, a label is written to side 16 of disc 12 concurrently with the writing of data to side 14 of disc 12. As indicated by arrow 236, controller 50 generates control signals directing rotary actuator 20 (both of which are shown in FIG. 1) to rotate disc 12 at generally the same velocity V2 during the writing of data and a label. As also shown in FIG. 6, controller 50 (shown in FIG. 1) generates control signals directing label writer 40 to write the label with laser beam 230. Laser beam 230 has a reduced spot size (schematically represented by the smaller circle) on disc 12. The reduced spot size increases the level of power per unit area or intensity on disc 12. The increased level of power per unit area on disc 12 provided by laser beam 230 at least partially compensates for the increased velocity V2 at which disc 12 is rotated during writing of the label concurrently with the writing of data as compared to the velocity V1 at which disc 12 is rotated during the writing of the label prior to or subsequent to the writing of data on disc 12.

As further shown by FIG. 6, the reduced spot size of laser beam 230 results in tracks 218 having smaller widths. To maintain contrast of a desired label being printed, controller 50 generates control signals controlling radial movement of label writer 40 across disc 12 so as to provide a greater density or reduced spacing S3 between consecutive tracks 218.

According to one example embodiment, label writer 40 is substantially identical to data writer 30 except that label writer 40 has optics (such as an objective lens) which do not remove spherical aberration arising from the correction for a substrate of disc 12 that the laser beam may travel through on the data side of disc 12. As a result, the spot size of laser beam 230 is reduced from eight micrometers in the focus position to one micrometer. The increased intensity of laser beam 230 partially accommodates for the increased velocity V2 at which disc 12 is rotated. To reduce contrast loss of the resulting label, controller 50 (shown in FIG. 1) further adjusts radial movement of label writer 40 across disc 12 to also increase the density of tracks 218 by a factor of eight. As noted above, the velocity V2 at which disc 12 is rotated during concurrent writing of data and a label is approximately 81 times that of the velocity V1 of the labeling mode in which the disc 12 is rotated during writing of a label prior or subsequent to the writing of data shown in FIG. 4. Because the smaller spot size increases the intensity of laser beam 230 by a factor of approximately eight, controller 50 generates control signals directing label writer 40 such that label writer 40 writes the label using a laser beam 230 having a power of approximately 10 times that of laser beam 210, 400 mW. Thus, by reducing the spot size of laser beam 230, system 110 facilitates use of a lower power laser beam 230 to write a label on disc 12 while data is also being written upon disc 12. In other embodiments, the reduced spot size of laser beam to 30 and the increased density of tracks 218 may have other values.

Figure 7:
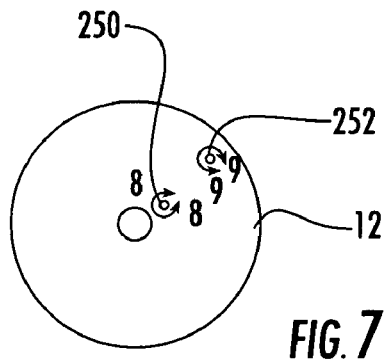
FIG. 7 is a plan view of a disc according to an example embodiment.
Figure 8:
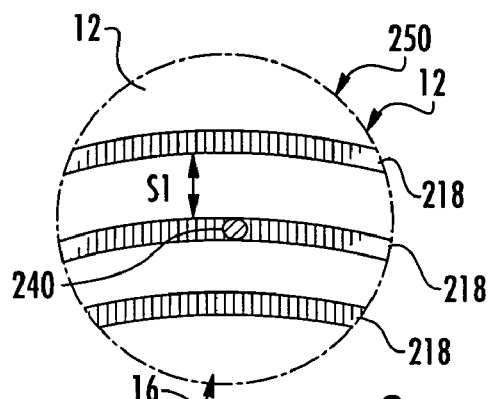
FIG. 8 is an enlarged fragmentary plan view of the disc of FIG. 7 taken along line 8-8 illustrating writing of a label according to one example of a labeling mode according to an example embodiment.
Figure 9:
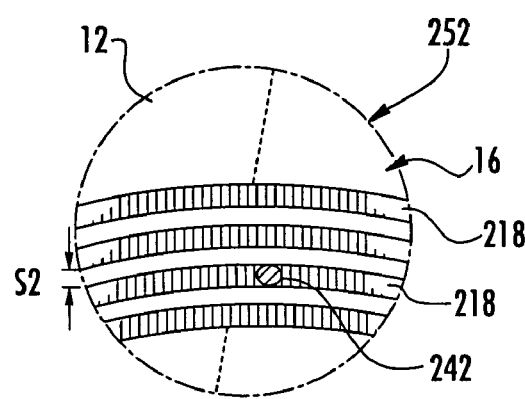
FIG. 9 is an enlarged fragmentary plan view of the disc of FIG. 7 taken along line 9-9 illustrating writing of a label according to the labeling mode of FIG. 8 according to an example embodiment.

FIGS. 7-11 schematically illustrate writing of a label upon disc 12 by system 10 while disc 12 is rotatably driven by rotary actuator 20 with a constant angular velocity. FIG. 7 illustrates two radial positions 250 and 252 upon disc 12 and at which a label may be written. Position 250 is radially inward of position 252. Because system 10 rotates disc 12 at a constant angular velocity when writing a label at position 250 and at position 252, position 250 of disc 12 will have a linear velocity that is less than the linear velocity of position 252 of disc 12. FIGS. 8-9 illustrate one label writing method or operating mode by which system 10 accounts for the different linear velocities at the different radial positions when disc 12 is rotated at a constant angular velocity. FIG. 8 is an enlarged fragmentary plan view of disc 12 illustrating writing of a label at position 250 with laser beam 240. FIG. 9 is an enlarged fragmentary plan view of disc 12 illustrating writing of a label with laser beam 242 at position 252. Laser beam 240 may be substantially identical to laser beam 220 or laser beam 230 described above. Laser beam 242 may be substantially identical to laser beam 220, laser 230. As shown by FIGS. 8 and 9, controller 50 (shown in FIG. 1) generates control signals controlling radial movement of label writer 40 (shown in FIG. 1) so as to increase the density of tracks 218 or decrease the spacing between consecutive tracks 218 from S1 (shown in FIG. 8) to S2 (shown in FIG. 9). This adjustment of tracks spacing by controller 50 is in addition to any adjustments made to compensate for the higher angular velocity at which disc 12 is rotated during concurrent writing of data and a label as described above with respect to FIGS. 5 and 6. By increasing the track density or reducing the spacing between consecutive tracks as label writer 40 (shown in FIG. 1) is radially moved outward, system 10 maintains label contrast that may otherwise be lost due to the increased linear velocity at which the label is written at radially outward portions of disc 12.

Figure 10:
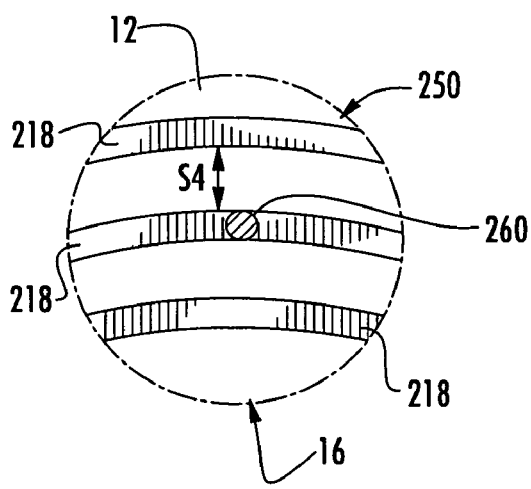
FIG. 10 is an enlarged fragmentary plan view of the disc of FIG. 7 taken along line 8-8 illustrating writing of a label according to another labeling mode according to an example embodiment.
Figure 11:
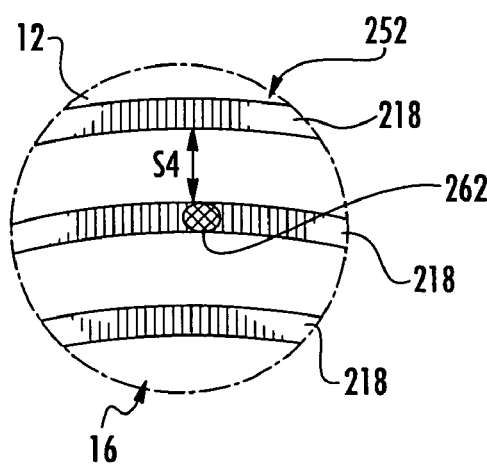
FIG. 11 is an enlarged fragmentary plan view of the disc out FIG. 7 taken along line 9-9 illustrating writing of a label according to the operating mode of FIG. 10 according to an example embodiment.

FIGS. 10-11 illustrate another label writing method or operating mode by which system 10 accounts for the different linear velocities at the different radial positions when disc 12 is rotated at a constant angular velocity. FIG. 10 is an enlarged fragmentary plan view of disc 12 illustrating writing of a label at position 250 by laser beam 260. FIG. 11 is an enlarged fragmentary plan view of disc 12 illustrating writing of a label at position 252 by laser beam 262. Laser beam 260 may be substantially similar to laser beam 220 or laser beam 230. Laser beam 262 may be substantially identical to laser beam 220, laser beam 230 or laser beam 260. As shown by FIGS. 10 and 11, controller 50 (shown in FIG. 1) generates control signals directing label writer 40 to increase the level of power of laser beam writing the label as label writer 40 is radially moved outward with respect to disc 12. This increase in power is in addition to any power or track spacing adjustments made to compensate for the higher angular velocity at which disc 12 is rotated during concurrent writing of data and a label as described above with respect to FIGS. 5 and 6.

In the example illustrated, the level of power of laser beam 262 is greater the level power of laser beam 260 (as schematically represented by the greater density of crosshatching). The increased intensity of laser beam 262 reduces any loss of contrast of a label being written despite the increased linear velocity at a location 252 as compared to location 250. At the same time, the spacing between consecutive tracks 218, S4, is the same. In other embodiments, 210 may both reduce tracks spacing and increase the level power of the laser beam as label writer 40 writes to more radially outward portions of disc 12, or conversely, increase track spacing and decrease the level of power of laser beam as label writer 40 writes to more radially inward portions of disc 12.

In addition to compensating for the increased linear velocity of disc 12 as label writer 40 is writing a label to more radially outward portions of disc 12 by reducing track spacing or increasing power, controller 50 (shown in FIG. 1) may also provide compensation by controlling the focus and resulting spot size of the laser beam. For example, in other embodiments, controller 50 may further be configured to generate control signals adjusting the focus of laser beams 242 or 262 to reduce the spot size (and increase the respective intensity) of the laser beam as a laser beam is writing to more outward radial portions of disc 12. Such compensation would be in addition to any adjustments made to compensate for the higher angular velocity at which disc 12 is rotated during concurrent writing of data and a label as described above with respect to FIGS. 5 and 6.

Figure 12:
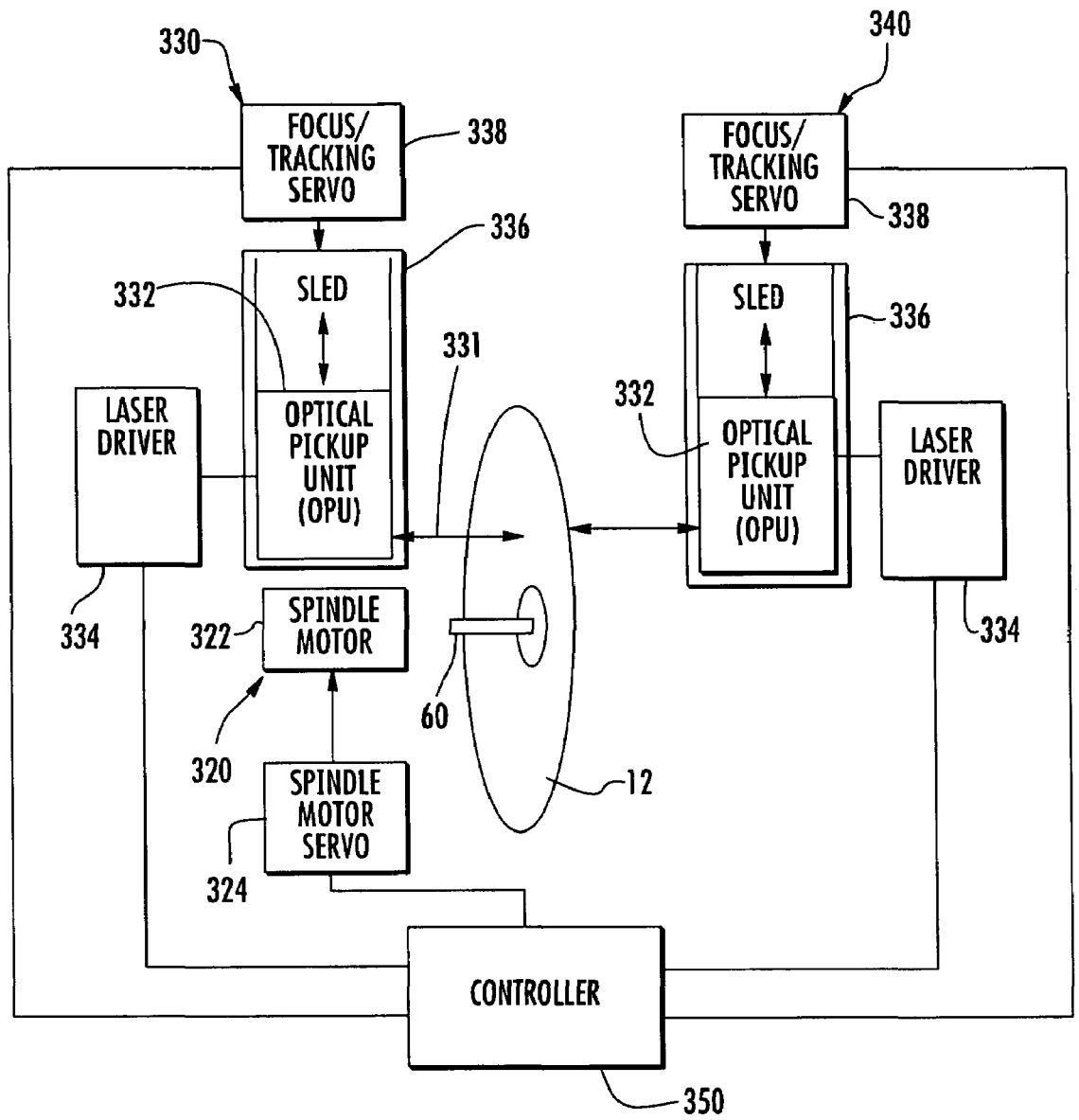
FIG. 12 is a schematic illustration of another embodiment of the disc interaction system of FIG. 1.

FIG. 12 schematically illustrates disc interaction system 310, another embodiment of disc interaction system 10. Disc interaction system 310 is configured to concurrently write both data and a label to opposite sides of disc 12. System 310 generally includes rotary actuator 320, data writer 330, label writer 340 and controller 350. Rotary actuator 320 comprise a device configured to rotate disc 12 about axis 60. Rotary actuator 320 includes spindle motor 322 and spindle motor servo 324. Spindle motor 320 comprises a motor configured to rotate disc 12. Spindle motor servo 324 comprises a device to sense the speed of which spindle motor 322 rotate disc 12 and to facilitate control of motor 322 to facilitate adjustment of the speed at which spindle motor 322 rotates disc 12. In particular embodiments, spindle motor servo 324 may be omitted.

Data writer 330 comprises a device configured to write data to disc 12 using a laser beam 331. Data writer 330 includes optical pickup unit 332, laser driver 334, sled 336 and focus/tracking servo 338. Optical pickup unit 332 generates and directs coherent light, such as a laser, in response to modulated voltage received from laser driver 334. Optical pickup unit 332 includes a source of coherent light, such as a laser diode, and optics including an objective lens configured to focus the light on disc 12. In particular embodiments, optical pickup unit 332 may additionally include a sensor, such as a photo detector, configured to sense and translate light reflected from disc 12 into machine-readable data.

Laser driver 334 comprises an integrated circuit configured to provide optical pickup unit 332 with modulated electrical current which drives the source of coherent light. Sled 336 comprises a mechanism configured to move optical pickup unit 332 radially with respect to disc 12. Sled 336 includes a guide and an actuator (not shown). The guide comprises a structure configured to physically support optical pickup unit 332 as optical pickup unit 332 is moved relative to disc 12. The actuator moves optical pickup unit 332 along the guide relative to disc 12. In one embodiment, the actuator may comprise a DC or stepper motor. In other embodiments, other motors or actuators may be employed.

Servo 338 comprises a mechanism configured to move and adjust positioning of the objective lens or other optics of optical pickup unit 332. Servo 338 includes a first actuator configured to move the objective lens in a direction generally perpendicular to a face of disc 12 to adjust a focus of the laser generated by optical pickup unit 332. Servo 338 further includes a second actuator configured to move the objective lens and a direction radial with respect to the face of disc 12 to adjust tracking of the laser generated by optical pickup unit 332. In one embodiment, the first and second actuators comprise motors. In particular embodiments, the first and second actuators may comprise voice coils. In other embodiments, other actuators may be used.

Label writer 340 is substantially similar to data writer 330. For ease of illustration, those components of a label writer 340 which correspond to components of a data writer 330 are numbered similarly. In one embodiment, optical pickup unit 332 and laser driver 334 are configured to provide a laser having a higher level of power as compared to optical unit 332 and laser driver 334 of data writer 332 to facilitate writing of a label on disc 12 according to the mode illustrated and described above with respect to FIG. 5. In other embodiments, servo 338 of label writer 340 may be alternatively configured so as to provide a more focused laser with a smaller spot size and increased track density according to the label writing mode as illustrated and described above with respect to FIG. 6. In some embodiments, label writer 340 may be configured to provide greater laser power, smaller spot size and increased track density.

Controller 350 comprises a processing unit configured to generate control signals directing and coordinating rotary actuator 320, data writer 330 and label writer 340. In particular, controller 350 generates control signals directing laser spindle motor servo 324 to supply power to spindle motor 322 to rotate disc 12. Controller 350 generates control signals directing laser driver 334 to appropriately modulate the electrical current so as to drive the light source of optical pickup unit 332 to generate a laser beam. Controller 350 further generates control signals directing sled of 336 to grossly position optical pickup unit 332 radially with respect to disc 12 and directing servo 338 to more precisely position optical pickup unit 332 radially with respect to disc 12. In response to control signals from controller 350, servo 338 further adjusts the position of the objective lens of optical pickup unit 332 to a properly focus the laser beam on to disc 12. Overall, controller 350 provides such data writing control signals to control the machine or computer-readable data written to disc 12 based upon input received by controller 350.

To concurrently write a label on disc 12, controller 350 generates control signals directing laser driver 334 provide an appropriately modulated electrical current to the light source (such as a diode) to generate a laser beam. Controller 350 further generates control signals directing sled 336 to grossly position optical pickup unit 332 radially with respect to disc 12 and control signals directing servo 338 to precisely position pick up unit 332 or its objective lens radially with respect to disc 12. In response to control signals from controller 350, servo 338 further precisely positions the objective lens of optical pickup unit 332 to appropriately focus the laser beam on disc 12. Controller 350 operaties under one or both of the label writing modes described above with respect to FIGS. 5 and 6. Controller 350 further operates in one or more of the label writing modes described above with respect to FIGS. 7-11 when the disc is being rotated at a constant angular velocity.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
a first laser configured to write data on a rotating disc;
a second laser configured to write a label on a rotating disc while the first laser is writing the data;
a rotary actuator configured to rotate the disc being a written upon; and
a controller in communication with the rotary actuator and configured to generate control signals, wherein the rotary actuator rotates the disc with an angular velocity of at least about 200 rpm at one time during writing of the label in response to the control signals, wherein the first laser is configured to write data with a first laser spot size when writing a radial distance from a center of the disc and wherein the second laser is configured to write the label with a second spot size smaller than the first spot size when writing at the radial distance from the center of the disc in response to the control signals.

2. The apparatus of claim 1 further comprising:
an actuator configured to radially move the second laser between a first radial position with respect to the disc and a second radial position with respect to the disc, wherein the second laser is configured to write the label with a first power at the first radial position and with a second power at t he second radial position.

3. The apparatus of claim 2, wherein the first radial position is outward of the second radial position and wherein the first power is greater than the second power.

4. The apparatus of claim 1 further comprising:
an actuator configured to radially move the second laser between a first radial position with respect to the disc and a second radial position with respect to the disc, wherein the second laser is configured to write the label with a first track density at the first radial position and with a second track density at the second radial position.

5. The apparatus of claim 4, wherein the first radial position is outward of the second radial position and wherein the first track density is greater than the second track density.

6. The apparatus of claim 1, wherein a the first laser is configured to write the data to a first side of the disc and wherein the second laser is configured to write a label to a second side of the disc.

7. The apparatus of claim 1, wherein the second laser is configured to write the label with a first track density and wherein the first laser is configured to write the data with a second greater track density.

8. The apparatus of claim 1 further comprising a rotary actuator configured to rotate the disc at a constant angular velocity as the data and the label are written at different radial positions on the disc.

9. The apparatus of claim 1 farther comprising a controller configured to generate control signals, wherein a power and a track density of the second laser adjust as a function of linear velocity of the rotating disc in response to the control signals.

10. The apparatus of claim 1, wherein the first laser is configured to write data with the first laser spot size at the radial distance with a laser beam having data power and wherein the second laser is configured to write the label with the second spot size at the radial distance from the center of the disc with a laser beam having a imaging power greater than the data power in response to the control signals.

11. A method comprising:
writing data on a disc with a first laser; and
writing a label on the disc with a second laser while the data is being written, wherein the disc is rotated at least about 200 rpm at one time during rotation of the disc while the label is being written, wherein the data is written by the first laser with a first spot size when writing at a radial distance from a center of the disc and wherein the label is written by the second laser with a second spot size smaller than the fist spot size when writing at the radial distance from the center of the disc.

12. The method of claim 11, wherein the data is written on a first side of the disc and wherein the label is written on a second side of the disc.

13. The method of claim 11 wherein the second laser has a first power at a first radial position on the disc and a second lesser power at a second radial position on the disc.

14. The method of claim 11, wherein the second laser writes the label with the first track density and the first laser writes the data was a second greater track density.

15. The method of claim 11 further comprising rotating the disc at a constant angular velocity as data is written at different radial positions on the disc.

16. The method of claim 11, wherein the first laser writes the data with a data power and wherein the second laser writes a label with a greater imaging power.

17. The method of claim 11, wherein the data is written with the first laser spot size at the radial distance with a laser beam having a data power and wherein the label is written with the second spot size at the radial distance from the center of the disc with a laser beam having a imaging power greater than the data power.

18. An apparatus comprising:
- a rotary actuator configured to rotate a disc;
- a first laser configured to write data on the disc;
- a second laser configured to write a label on the disc; and
- means for controlling the first laser and at least one of second laser and the rotary actuator to write the label on a label side of the disc with the second laser while rotary actuator rotates the disc at a speed at which data is written on the disc, wherein the means for controlling is configured such that data is written by the first laser on the disc at a first radial distance from a center of the disc with a first laser beam having a first spot size and wherein the label is written by the second laser on the disc at the radial distance from the center of the disc with a second laser beam having a second spot size smaller than the first spot size.

* * * * *

UNITED STATES PATENT AND TRADEMARK OFFICE
CERTIFICATE OF CORRECTION

PATENT NO. : 7,538,788 B2 Page 1 of 1
APPLICATION NO. : 11/415038
DATED : May 26, 2009
INVENTOR(S) : Darwin M. Hanks et al.

It is certified that error appears in the above-identified patent and that said Letters Patent is hereby corrected as shown below:

In column 9, line 52, in Claim 1, after "being" delete "a".

In column 10, line 3, in Claim 2, delete "t he" and insert -- the --, therefor.

In column 10, line 16, in Claim 6, after "wherein" delete "a".

In column 10, line 28, in Claim 9, delete "farther" and insert -- further --, therefor.

In column 10, line 34, in Claim 10, after "having" insert -- a --.

In column 10, line 48, in Claim 11, delete "fist" and insert -- first --, therefor.

In column 11, line 10, in Claim 18, insert -- the -- before "second".

In column 11, line 11, in Claim 18, after "while" insert -- the --.

Signed and Sealed this

Twenty-second Day of June, 2010

David J. Kappos
*Director of the United States Patent and Trademark Office*